United States Patent [19]

Siryj et al.

[11] 4,274,294
[45] Jun. 23, 1981

[54] APPARATUS FOR CONVERTING ROTARY MOTION TO LINEAR MOTION

[75] Inventors: Bohdan W. Siryj, Cinnaminson; Loren D. Moore, Palmyra, both of N.J.

[73] Assignee: RCA Corporation, New York, N.Y.

[21] Appl. No.: 53,922

[22] Filed: Jul. 2, 1979

[51] Int. Cl.³ .................. F16H 27/02; F16H 29/02
[52] U.S. Cl. ......................... 74/89.15; 74/424.8 R
[58] Field of Search ........ 74/89.15, 424.8 R, 424.8 A; 85/46

[56] References Cited

U.S. PATENT DOCUMENTS

| 2,233,915 | 3/1941 | Conrad | 74/424.8 R |
| 2,567,483 | 9/1951 | Hotine | 85/46 |
| 2,894,408 | 7/1959 | Verhoeff | 74/424.8 R |
| 3,004,445 | 10/1961 | Mondon | 74/424.8 R |
| 3,337,732 | 8/1967 | Opocensky | 250/52 |
| 3,654,816 | 4/1972 | Beery et al. | 74/424.8 R |
| 4,041,793 | 8/1977 | Repay et al. | 74/424.8 R |

FOREIGN PATENT DOCUMENTS 426094 10/1974 U.S.S.R. .............. 74/424.8 R

Primary Examiner—Lawrence J. Staab
Attorney, Agent, or Firm—Samuel Cohen; William Squire

[57] ABSTRACT

Apparatus for converting rotary motion of a screw into linear motion includes three circumferentially spaced nut segments each resiliently mounted for displacing in a radial direction normal to the screw axis. A thin flat plate spring member provides a resiliency to the nut segments in a direction normal to the screw axes. The nut segments include a set of parallel triangular screw threads with the roots undercut and the crests removed for averaging out the contact between the nut segments and the screw to an area along the pitch diameter of the screw.

8 Claims, 6 Drawing Figures

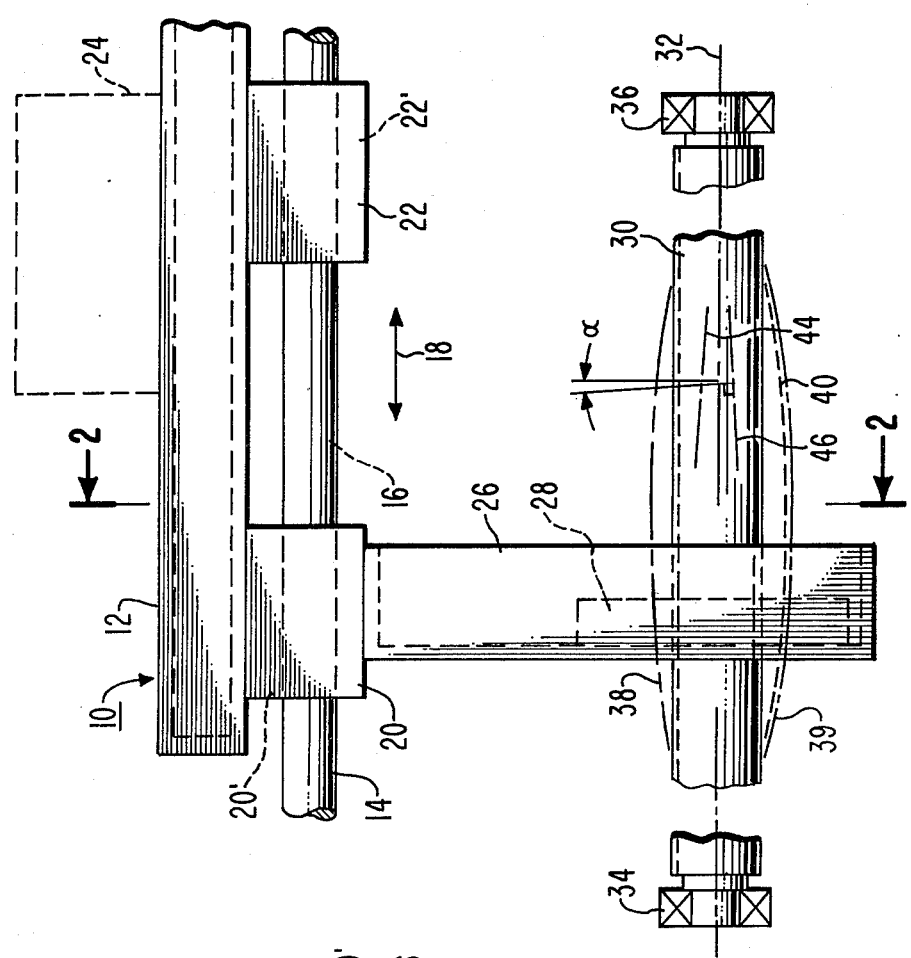
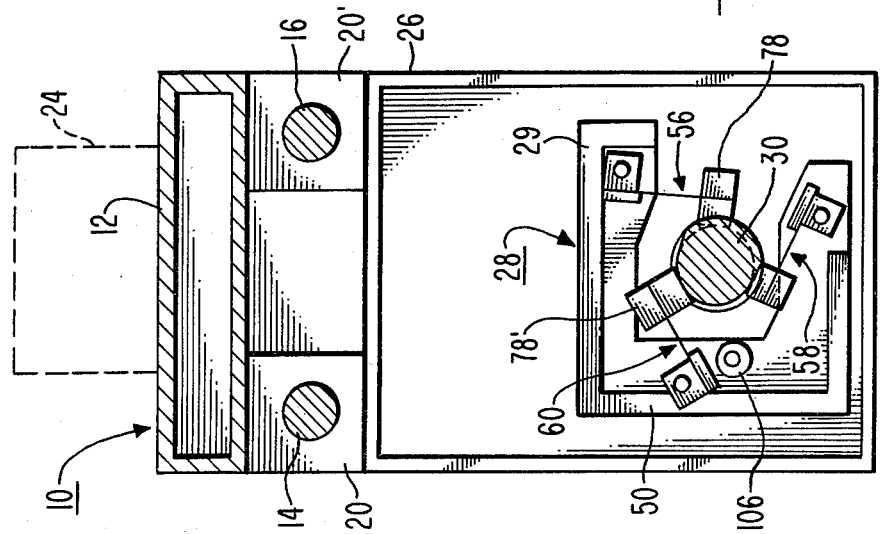
Fig. 1.
Fig. 2.

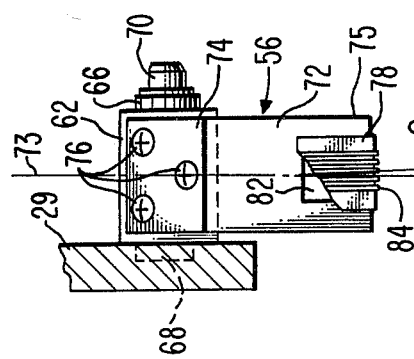
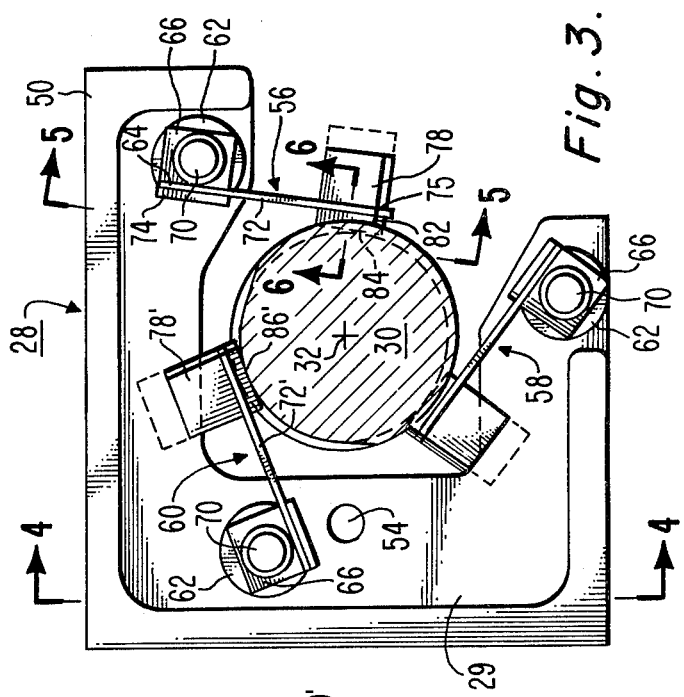
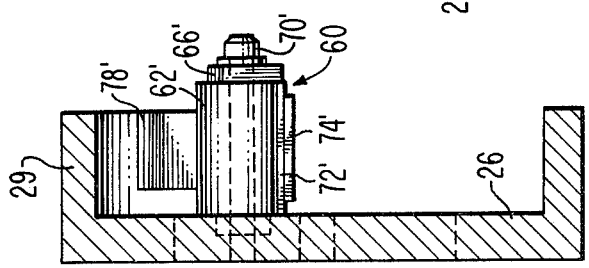
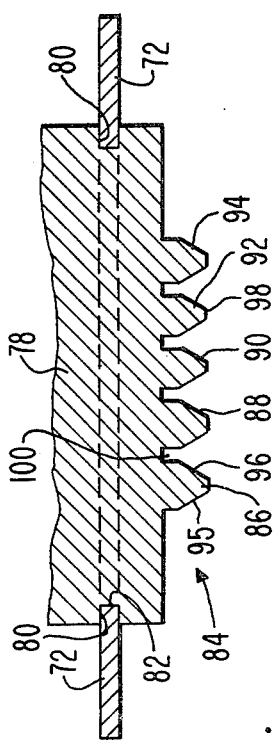

APPARATUS FOR CONVERTING ROTARY MOTION TO LINEAR MOTION

The United States Government has rights in this invention pursuant to a contract awarded by a Department of the government.

The present invention relates to an apparatus for converting rotary motion of a screw drive into a linear motion, and, more particularly, to a lead-screw driven drive nut mountable on a carriage for converting rotatable motion of the lead-screw to linear motion of the carriage.

Lead-screw systems are well known. In these systems a carriage moves along one or more guide rods parallel to the lead-screw. The carriage is coupled to the rotating lead-screw by a threaded member, or drive nut, mounted on the carriage. The lead-screw is driven by a reversable motor, the rotational movement of the lead-screw being translated by the drive nut into linear movement of the carriage along the axis of rotation of the screw.

In certain implementations of this apparatus it is desirable that the rotating motion of the lead-screw be converted precisely into linear motion of the carriage to a high degree of accuracy. Such a requirement is necessary, for example, where the carriage carries optical recording devices. Such recording devices may include, for example, a rotating drum on which is mounted a film strip. A stationary laser directs a laser beam toward the film strip. The laser beam may be intensity modulated by a control for transferring data onto the film. The film being sensitive to the beam intensity records this information. To provide high density recording, a relatively small diameter laser beam traverses a path on the rotating film in closely packed light paths or "lines." Should any discrepancy occur between the linearity of the translating carriage with respect to the rotation of the lead-screw, undesirable variations in separation between the adjacent lines on the recorded film result.

While lead-screw drives are relatively simple and well known, they present a number of problems in a precise translating environment as described above. Since both the lead-screw and the drive nut are threaded devices, extremely tight tolerances are required in their manufacture to preclude backlash, i.e., spacing between the screw and the nut threads.

Attempts to manufacture a lead-screw and drive nut combination to very tight tolerances, to produce line to line variations of linearity along the length of travel in the order of 0.000050 in. and below have proven to be impractical. However, screws with 0.000010 in pitch to pitch variations have been made. The most prominent variations is that the lead-screw being a relatively long rod, which extends the length of travel to which the carriage is subjected, develops a slight bow due to its own weight which is most pronounced at the midregion thereof. Also, while the lead-screw may be mounted in precision bearings, variations in the bearing mountings as well as bearing eccentricity can lead to misalignment between the lead-screw and carriage guide rods. As previously stated precision machining of lead-screw threads can be provided. However, the bowing problem can not be easily dealt with. This causes the mating nut to travel along an axis not exactly parallel to the axis of rotation of the lead-screw causing undesirable variations in line separation or "banding" problems in the recorded data.

An apparatus in accordance with the present invention converts rotary motion of a screw about a given axis to linear motion parallel to that axis in the presence of distortion of the screw from the axis during the rotary motion. The apparatus includes a frame member and a plurality of nut segments. Each segment includes a set of parallel linear teeth adapted to tangentially engage the thread of the screw. A like plurality of resilient segment mounting means are secured to the frame. Each mounting means resiliently secures a different segment to the frame for resilient radial displacement of that segment in a direction normal to the given axis and further secures that segment from displacement in a direction normal to the radial direction. The segments are circumferentially equally spaced about the given axis whereby the segments translate uniformly in a direction along the given axis with respect to the rotating screw while radially resiliently deflecting in response to the distortion during the translation.

IN THE DRAWING

FIG. 1 is a fragmentary side elevation view of a carriage and lead-screw nut assembly embodying the present invention, FIG. 2 is a sectional view of the apparatus of FIG. 1 along lines 2—2, FIG. 3 is an end elevational view of the lead-screw and nut assembly portion of the apparatus of FIG. 2 illustrating the various portions thereof in more detail, FIG. 4 is a sectional side view of the apparatus of FIG. 3 taken along lines 4—4, FIG. 5 is a plan view of a portion of the nut assembly of FIG. 3 taken along lines 5—5, and FIG. 6 is a sectional view of the thread portion of a nut segment of FIG. 3 taken along lines 6—6.

In FIG. 1 a carriage assembly 10 includes a platform 12 mounted for axial movement in directions 18 on a pair of guide rods 14 and 16. (See FIG. 2.) Guide rod 14 is slideably mounted within bearing blocks 20 and 22 while the guide rod 16 is mounted in bearing blocks 20' and 22'. Mounted on the platform 12 is an optical system 24 (dashed) which may include a recording head which generates "lines" on a rotating drum mounting a film on which a beam of laser light is intensity modulated. The modulation of the laser beam (not shown) includes data to be recorded on the film. The film is attached to the drum surface and rotated about the drum axis as the carriage platform 12 is translated in one of directions 18. To ensure accurate recording of the beam of laser light on the film, the path of the beam must follow a spiral on the film in which the bands formed by adjacent paths of recorded light are equally spaced from each other to fine tolerances. This permits reading of the film by a suitable recorder (not shown) in accordance with the band spacing as determined by the recording rate. Any variation of the band spacing from this desired tolerance level may result in losing data during the reading of the film. Such unequal spacing or "banding" on the recorded data is highly undesirable.

Mounted to the carriage platform 12 is a drive frame 26 which suspends from the underside of the carriage platform. Drive nut assembly 28 (shown dashed in FIG. 1) is mounted to the frame 26. The nut assembly 28 engages a rotating threaded lead-screw 30 which rotates about its elongated axis 32. The lead-screw 30 is mounted at its extremities by precision bearings 34 and 36 and driven by a reversing motor (not shown). Lead-screw 30 is machined to extremely close tolerances (for example 0.000010 pitch to pitch variation of the threads). The bearings 34 and 36 are extremely precise bearings for mounting the lead-screw 30. Bearings 34 and 36 align the lead-screw 30 for rotation about the axis 32.

The lead-screw 30 is relatively long and rod-like and may be several inches in diameter and several feet in length. Regardless the care and precision exercised in the machining of the screw 30 the shear weight of the screw as it is suspended between bearings 34 and 36 results in slight bowing of the screw 30. This bowing is shown by the dashed line 40 which is exaggerated. The depicted bowing as shown by dashed line 40 exists at low speeds prior to dynamics setting in. Depending upon speed and residual unbalance the screw may take many different shapes. In all situations however the screw under dynamic conditions will generate some form of ellipsoid as it shown by dashed lines 38 and 39. The screw does not rotate about the axis 32 but about displaced axis 46 due to the bowing action. A nut in firm contact with the lead-screw when reaching these bowed sections would have a tendency to be distorted from the vertical or normal to axis 32 by an angle $\alpha$. This slight distortion of the nut with respect to the normal to the axis 32 results in variations or non-linearity of translation of the carriage platform 12 in directions 18 (parallel to axis 32) with respect to the rotation of the lead-screw 30. As mentioned above, such variations in linearity are highly undesirable for the implementation described in an optical recording system. No known nut assembly can accommodate a lead-screw nut and carriage driving apparatus to achieve the desired accuracy.

The nut assembly 28 described in accordance with the present invention compensates for this bowing distortion of the lead-screw illustrated in FIG. 1 and provide accurate linear conversion of the motion of the carriage platform 12 with respect to the rotary motion of lead-screw 30. The nut assembly 28, FIG. 3, includes a frame 50 which is generally U shaped for ease of assembly as shown. The frame 50 is mounted via bolt 106 (FIG. 2) or other fasteners via aperture 54 (FIG. 3) to the carriage frame 26. Assembly 28 includes three substantially identical nut subassemblies 56, 58 and 60.

Since subassemblies 56, 58 and 60 are substantially the same, only one will be described in detail. In FIGS. 3, 4 and 5 assembly 56, for example, includes a cylindrical pivot post 62. Post 62 is a cylindrical member which is flattened or plane along the length thereof on one side 64. Post 62 has a square end 66 at one end and a cylindrical shoulder 68 at the other end and which is mounted within a like cylindrical recess in frame 29. Pivot post 62 is mounted to the frame 29 by a cap screw 70.

A phosphor bronze relatively thin leaf spring 72 is mounted to the plane side 64 on the post 62 by a mounting plate 74 and screws 76 (FIG. 5). The cantilevered end 75 of leaf spring 72 has nut segment 78 mounted thereto. The leaf spring 72 may be, for example, 0.015 inches thick spring tempered phosphor bronze sheet metal. Nut segment 78 is formed with a pair of parallel grooves 80 (FIG. 6) which mate within a slot 82 in the leaf spring 72 which form a tight friction fit. Nut segment 78 (FIG. 6) is also formed with a set 84 of parallel linear teeth 86, 88, 90, 92 and 94 of like cross section which mate with the threads of lead-screw 30. Sides 95 and 96 of each tooth are, respectively, parallel plane surfaces. The crests 98 of the teeth are plane surfaces with the tips removed. The roots of the teeth are formed with a straight channel or undercut 100. That is the roots of the tooth structure are removed. This leaves a tooth structure formed by the side walls 95 and 96 which lies substantially along the pitch diameter of the threads of lead-screw 30. This screw thread structure tends to average out slight pitch-to-pitch variations of the lead-screw to further increase the accuracy of the translation of the rotary motion of the lead-screw to the nut.

Because the teeth 86, 88, 90, 92 and 94 are linear and parallel as compared to the cylindrical configuration of the lead-screw 30, the threads of the screw 30 contact one or more of the mating teeth 84 of the nut segment 78 tangentially along approximately the pitch diameter of the lead-screw 30. Because the pitch diameter of the teeth 86, 88, 90, 98 and 94 lie on a common plane the radial variations of the pitch diameter of adjacent threads of a lead screw may result in possibly one of the five adjacent teeth of a lead-screw contacting the corresponding one tooth of the nut segment 78 for that lead-screw tooth which has a maximum pitch diameter. Thus any slight discrepancies in the pitch diameter between adjacent teeth on the lead-screw tends to be ignored by the thread structure of the nut segment 78.

The long axis 73 (FIG. 5) of spring 72 and teeth set 84 which are parallel to axis 73 are at the helix angle $\beta$ of the threads of screw 30. This angle is very small and is exaggerated in the drawing. Posts 62 are parallel to axis 32. Thus the threads of set 84 are parallel to the tangent of the helix of the screw threads.

The nut segments 78 of each assembly 56, 58 and 60 are displaced from each other about the lead screw equally or about 120°. Pivot posts 62 of each assembly 56, 58 and 60 are also mounted 120° apart about the axis 32. The pivot point for the post 62 of each assembly is such that the set of teeth 84 of each nut segment 78 are radially aligned to be tangent to the pitch diameter of the screw as is the plane in which the spring member 72 lies. Springs 72 are relatively wide in directions 18 (FIG. 1). For example, spring member 72 material which may be 0.015 inches thick may have a width into the drawing of FIG. 3 along axis 32 of 0.75 inches. The relatively large width of the spring 72 parallel to the axis 32 prevents displacement of the nut segment 78 into or out of the drawing of FIG. 3 in a direction parallel to axis 32.

Thus even in the presence of bowing in the lead screw no displacement of the nut segment 78 in a direction parallel to axis 32 occurs at the point of such bowing. However, due to the bowing action the screw thread is radially displaced somewhat from the axis as described above in connection with FIG. 1. To permit such displacement in the radial direction, the spring member 72 flexes in the radial direction inwardly or outwardly in the direction normal to axis 32. This prevents any binding action that would occur with a close fitting thread or excess play with a loose fitting thread of prior art nuts. Such prior art nuts usually encircle the lead-screw, are deflected at an angle $\alpha$ (FIG. 1) which angular deflection may also cause displacement in the directions 18 of the platform 12 causing non-linearity in the lead-screw transmitted motions. Each of the corresponding nuts 56, 58 and 60 are displaced in this radial direction normal to axis 32 (shown dashed, FIG. 3) in the presence of such bowing of the lead-screw 30 without angular distortion of the nut therefore maintaining the linearity of the screw to nut motions.

To assemble each of the nut segments 78 to assemblies 56, 58 and 60 while minimizing distortion introduced via non-uniform loading of the nut assemblies, the following procedure may be utilized. The frame 29 of nut assembly 28 is locked to the frame 26 by a single screw 106, FIG. 2. Spring locking plate 74 and leaf spring 72 are secured snugly but are able to move with respect to each other. Pivot post 62 is mounted snug but able to rotate. Each nut segment 78 is assembled to a leaf spring and fit snugly into position against the thread of the lead-screw 30. At this time each of the three spring member 72 hold-down plates 74 are locked in place. A torque wrench is then attached to the square end 66 of each pivot post 62 in sequence and the nut assembly forced against the lead-screw 30 by the torquing action of the torque wrench and a reading preferably of 8 inch-ounces on the wrench obtained. Each pivot post 62 is then locked to the frame 29 by cap screw 70. This assembly technique minimizes the distortion introduced to the lead-screw 30 by non-uniform forces exerted by each of the nut segments in a radial direction on the screw.

The resilient mounting of each of the nut segments 78 against the lead-screw 30 accommodates variations of lead-screw 30 in a radial direction normal to axis 32, including limited angular variations of the screw. At the same time, the nut assemblies 56, 58 and 60 are extremely stiff in the axial directions 18 preventing significant displacement of the nuts in these directions. Extremely accurate translation of the carriage platform 12 in the directions 18 is provided with respect to the rotation of the lead-screw 30 by preventing such displacement of the nut segments in the directions 18. Fluctuations of the nut segments 78 in the radial direction does not significantly affect this linear relationship. No binding occurs because each of the nut segments formed by the assemblies 56, 58 and 60 operate independently of each other but yet cooperate with each other as a complete nut assembly to achieve the purpose of converting the rotary motion of a lead-screw to linear translation.

In FIG. 4 nut assembly 60 is illustrated with the same numbers as on assembly 56 but with the numbers primed. Those numbers that are the same with or without the primes represent identical parts.

What is claimed is:

1. Apparatus for converting rotary motion of a screw about a given axis to linear motion parallel to that axis in the presence of distortion of the screw from said axis during said rotary motion comprising:
a frame member,
a plurality of nut segments each including a set of parallel, linear teeth adapted to tangentially engage the threads of said screw, said teeth having their roots undercut and crests removed leaving a tooth structure comprising a side wall which lies substantially along the pitch diameter of said screw, and
a like plurality of resilient segment mounting means secured to said frame, each mounting means resiliently securing a different segment to the frame for resilient radial displacement of that segment in a direction normal to said given axis and further securing that segment from displacement in a direction normal to said radial direction, said segments being circumferentially equally spaced about said given axis whereby said segments translate uniformly in a direction along said given axis with respect to said rotating screw while radially resiliently deflecting in response to said distortion during said translation.

2. The apparatus of claim 1 wherein said mounting means includes a sheet of resilient material having a thickness much less than its width and length, the plane of said sheet being normal to the direction of said radial displacement, said sheet being cantilevered from said frame with said segment secured thereto adjacent and facing said screw at the cantilevered portion of said sheet.

3. An apparatus comprising:
a carriage,
guide means for mounting and guiding the carriage in a given direction,
means for translating the carriage along said guide means in said given direction comprising:
(a) an elongated rotatable screw whose elongated axis is substantially parallel to said given direction and adapted for rotation about said axis, and
(b) screw engaging means fixed to said carriage and engaging said screw for translating the motion of said screw into motion of said carriage along said given direction, said screw engaging means resiliently displacing in the radial direction substantially normal to said axis,
said screw engaging means including at least one nut segment including a set of parallel, linear teeth having their roots undercut and their crests removed leaving a tooth structure comprising a side wall which lies substantially along the pitch diameter of said screw.

4. The apparatus of claim 3 wherein said means for translating includes a spring member having a substantially single degree of freedom in a direction normal to said given direction.

5. The apparatus of claim 4 wherein said spring member includes a flat plate spring cantilevered over said screw at one end and fixed to said carriage at the other end, the plane of said plate being parallel to said given direction and further including screw engaging means secured to said one end and in engagement with said screw.

6. The apparatus of claim 5 wherein said screw engaging means includes an array of parallel frustro-triangular teeth separated by a channel at the root of adjacent teeth.

7. An apparatus for engaging a rotating screw and for translating the rotation of said screw into linear motion in an axial direction parallel to the rotating axis of the screw comprising:
a frame, and
a plurality of circumferentially equally spaced screw engaging teeth members secured to said frame, each member including means for resiliently urging that member only in a radial direction normal to said axial direction in engagagent with said screw and for fixing said teeth members with respect to said frame in a direction tangential to the screw helix, said teeth members including a set of parallel, linear teeth which have their roots undercut and their crests removed leaving a tooth structure comprising a side wall which lies substantially along the pitch diameter of said screw.

8. The apparatus of claim 7 wherein said means for resiliently urging includes a resilient plane member fixed at one end to said frame and cantilevered at a second end over said screw, the plane of said plane member being parallel to said axial direction.

* * * * *